(12) United States Patent
Harada et al.

(10) Patent No.: US 7,741,563 B2
(45) Date of Patent: Jun. 22, 2010

(54) CLOSED TYPE CABLE OR THE LIKE PROTECTION AND GUIDE DEVICE

(75) Inventors: Mitsuhiro Harada, Osaka (JP); Masaaki Ikeda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 377 days.

(21) Appl. No.: 11/849,980

(22) Filed: Sep. 4, 2007

(65) Prior Publication Data
US 2008/0121425 A1 May 29, 2008

(30) Foreign Application Priority Data
Nov. 27, 2006 (JP) .............................. 2006-319355

(51) Int. Cl.
*H02G 3/04* (2006.01)
*H02G 3/00* (2006.01)

(52) U.S. Cl. .................. 174/68.1; 174/72 A; 174/70 R; 174/68.3; 138/177; 138/103

(58) Field of Classification Search ................ 174/480, 174/481, 70 R, 72 A, 71 R, 72 R, 74 R, 88 R, 174/135, 650, 68.1, 68.3, 95, 112, 652; 138/177, 138/103, 123, 124, 92, 167; 285/423, 18, 285/20, 155.1, 333
See application file for complete search history.

(56) References Cited
U.S. PATENT DOCUMENTS

| | | | | |
|---|---|---|---|---|
| 4,218,814 A | * | 8/1980 | Hodapp | ....................... 138/167 |
| 4,248,459 A | * | 2/1981 | Pate et al. | .................. 174/72 R |
| 4,647,719 A | * | 3/1987 | Campbell et al. | .......... 174/88 R |
| 5,535,787 A | * | 7/1996 | Howell | ........................ 138/167 |
| 5,763,832 A | * | 6/1998 | Anselm | ....................... 174/652 |
| 6,825,418 B1 | * | 11/2004 | Dollins et al. | ................ 174/112 |
| 6,903,276 B2 | * | 6/2005 | Eisele | ....................... 174/88 R |
| 7,560,644 B2 | * | 7/2009 | Ford et al. | .................. 174/68.1 |

FOREIGN PATENT DOCUMENTS

| | | |
|---|---|---|
| JP | 2003-176854 | 6/2003 |
| JP | 2003-30992 | 10/2003 |
| JP | 2004-332820 | 11/2008 |

* cited by examiner

*Primary Examiner*—Angel R Estrada
(74) *Attorney, Agent, or Firm*—Woodling, Krost and Rust (57) ABSTRACT

A closed type cable or the like protection and guide device that reduces noise generation due to the generation of sliding contact sound during operation prevents entry of fine chips and wear powders of metal into the cable or the like protection and guide device. Scattering of contact wear powders, which are generated by sliding contact between components of the cable or the like protection and guide device, into the operation space can be prevented and a maintenance of the device is reduced. A cable or the like is included in a flexible support to be protected and guided from a fixed end side mounting member toward a movable end side mounting member and the entire outer surface of the flexible support except for an inlet and an outlet of the cable or the like is covered with a heat resistant tubular cloth cover.

4 Claims, 6 Drawing Sheets

CLOSED TYPE CABLE OR THE LIKE PROTECTION AND GUIDE DEVICE

This application claims priority to Japanese Patent Application No. 2006-319355 filed Nov. 27, 2006.

TECHNICAL FIELD

The present invention relates to a cable or the like protection and guide device which protects and guides a cable (cables) or the like during use. The cable may be an electric cable which supplies and transmits electric power or electric signals. The cable may be a hose which supplies hydraulic pressure or pneumatic pressure or the like between a movable section of a machine tool or civil engineering machinery. The cable may operate a conveyance device or the like. The cable is operated between a moving and a fixed section. A control device may be used in connection with the cable which includes an operating terminal or the like which controls the operation of the movable section, and more specifically it relates to a closed type cable or the like protection and guide device, which prevents the entry of chips and wear powder of metal therein.

BACKGROUND TECHNOLOGY

When a movable section of a machine tool, civil engineering machinery, a conveyance device or the like is in motion, the other end is connected to a fixed section which includes a control device or an operating terminal or the like which controls the operation of the movable section. A cable or hose, which supplies and transmits electric power/electric signals or hydraulic pressure or pneumatic pressure, follows the movable section in an exposed manner and forcible torsion or tensile force is generated so that the cable or hose is not only damaged but also the outer appearance thereof is distorted. Thus there has been proposed a cable or the like protection and guide device which guides the cable or hose and protects it.

Figure 7:
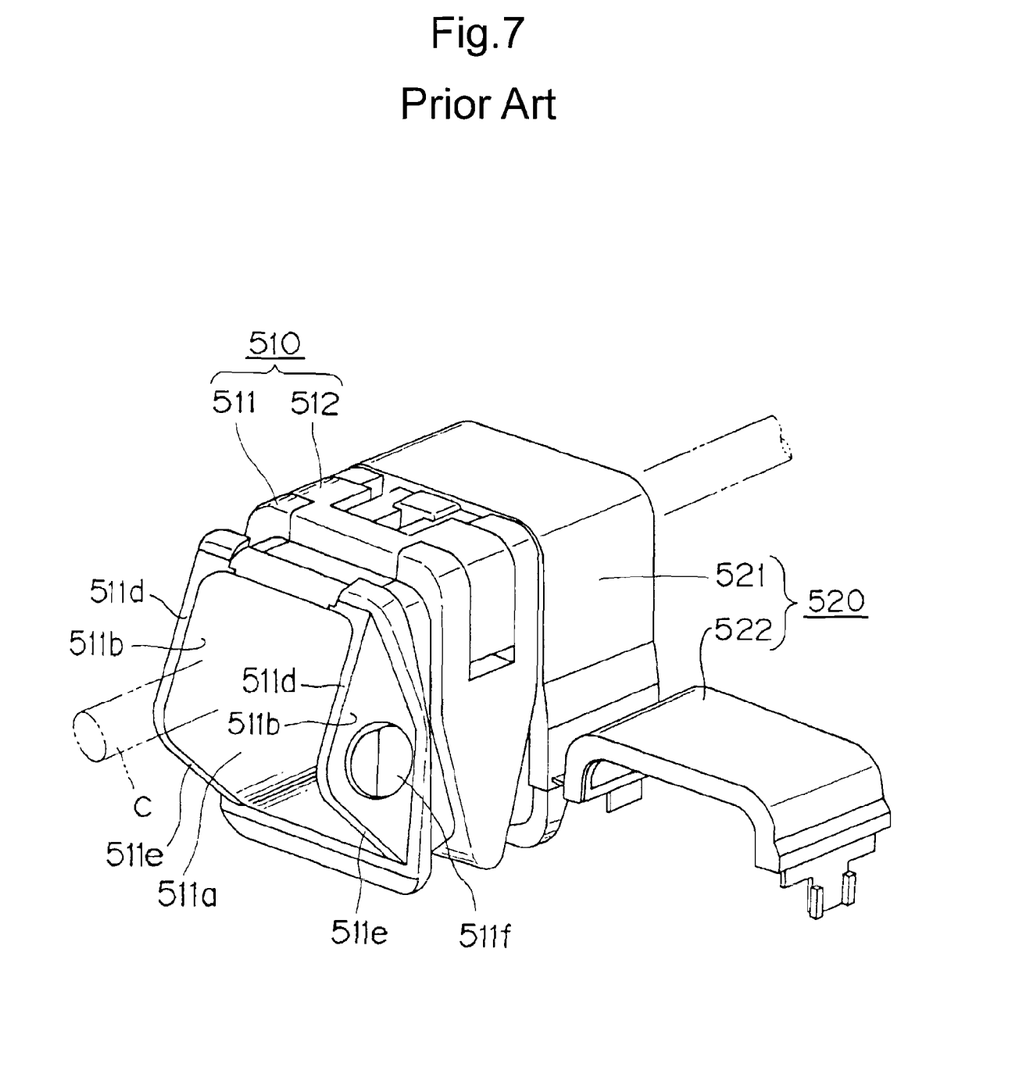
FIG. 7 is a partially enlarged perspective view of a conventional closed type cable or the like protection and guide device.
Figure 8:
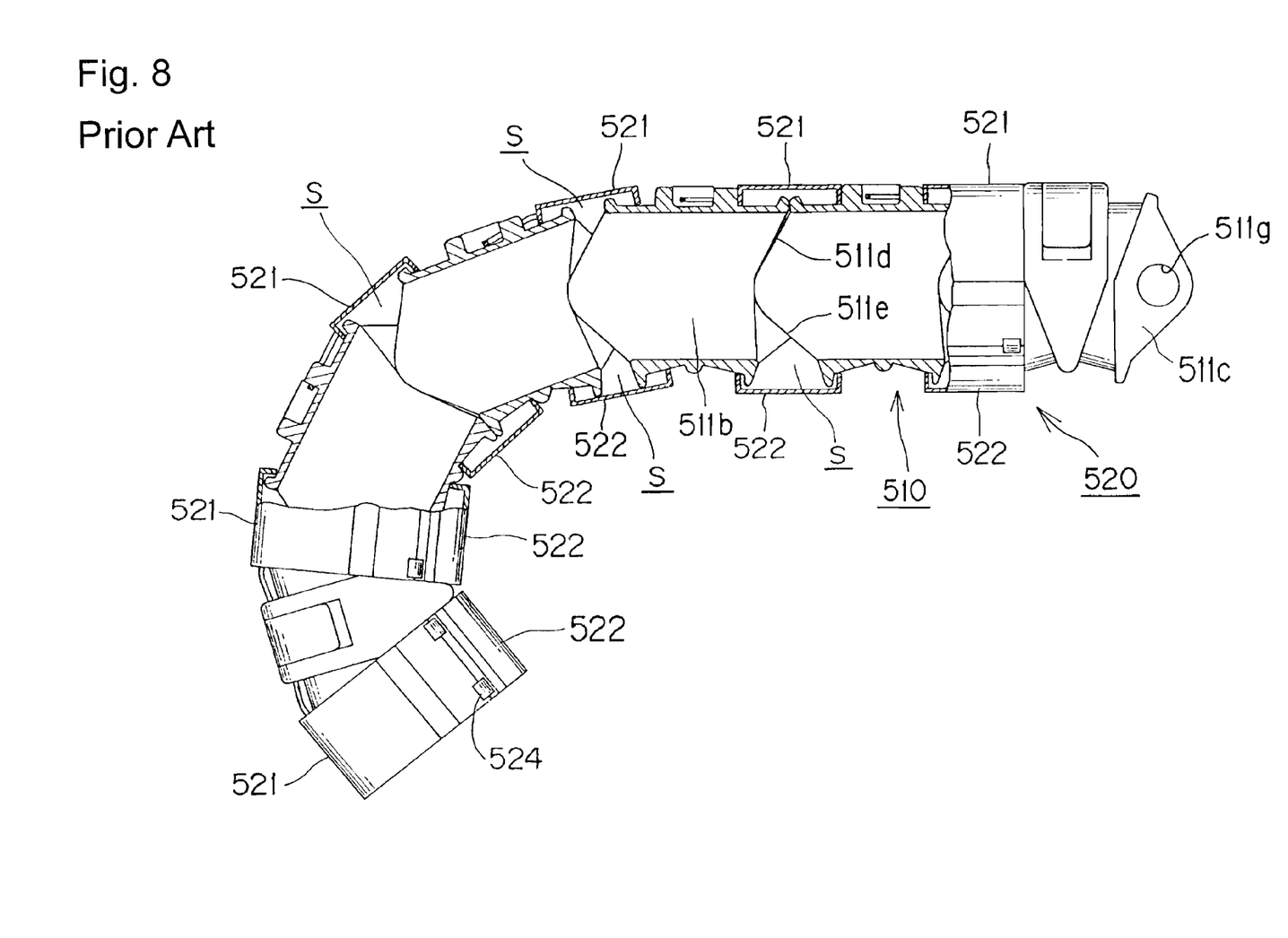
FIG. 8 is a side cross-sectional view showing an operation state of the closed type cable or the like protection and guide device shown in FIG. 8.

For example, as shown in FIGS. 7 and 8, a conventional cable or the like protection and guide device 500 includes, protects and guides a cable or the like C by flexibly connecting a number of inner frames 510. Each inner frame comprises an inner frame body 511 in which the cable or the like holding space 511*a* is formed inside, an opening/closing lid body 512, an outer frame 520 comprising an upper side outer frame 521 and a lower side frame 522. Lower side frame 522 is removably provided on a connected portion between the inner frames 510. Upper side outer frame 521 and lower side frame 522 are fitted into each other for surrounding an upper opening end surface 511*d* which abuts on the adjacent upper opening end surface on an flexional outer circumferential side to hold a straight extended position, and a lower opening end surface 511*e* which abuts on the adjacent lower opening end surface on an flexional inner circumferential side. While the device circulates (moves) it holds a predetermined flexional position so that connecting gaps S between adjacent inner frames 510 are respectively closed. See Japanese Patent Publication No. 3349148.

PROBLEMS TO BE SOLVED BY THE INVENTION

The above-mentioned cable or the like protection and guide device 500 uses an outer frame 520 which is a steel sheet or a hard glass fiber reinforced polyamide resin in view of the strength of the member, wear properties, shape retention and the like. As shown in FIG. 8, when the upper opening end surface 511*d* which holds a straight extended position sequentially abuts on the adjacent upper opening end surface on a flexional outer circumferential side or when the lower opening end surface 511*e* which holds a predetermined flexional position sequentially abuts on the adjacent lower opening end surface on a flexional inner circumferential side while circulating (moving), backlash noise is generated. When the upper opening end surfaces 511*d* and the lower opening end surfaces 511*e* of the inner frames 511 respectively abut each other, an outer frame 520, which moves so that it surrounds and closes the connected gap S between the inner frames 510, generates sliding contact noise between the outer frame 520 and the inner 510. These noises are problems during operation. It is noted that the connection between the inner frames 510 is carried out by fitting a connecting convex portion 511*f* provided on and with connecting portion 511*b* together with a connecting hole portion 511*g* provided on and with connecting portion 511*c*.

The connecting gap S between the inner frames 510 is surrounded by an outer frame 520 and is closed. However, a slight gap is unavoidably generated between the inner frame 510 and the outer frame 520 to smoothly move the cable or the like protection and guide device 500 in a flexible manner. As a result, fine chips or wear powders of metal which are generated in a machine tool or the like enter the inside of the cable or the like protection and guide device 500 and damage a cable or the like C. The chips or wear powders may enter sliding contact surfaces of inner frames 510 so that they prevent the inner frames 510 from smooth operation. When a component of the cable or the like protection and guide device 500 is in need of replacement it is very difficult.

When the repetition of flexional extended operations are repeated with cables or the like C, contact wear powders generated by friction between the cables or the like C, sliding contact between inner frames 510 or sliding contact between the cables or the like C and the inner frame 510, scatter in the operation space.

The object of the present invention is to reduce maintenance by providing a simple closed type cable or the like protection and guide device that reduces noise generation due to the generation of sliding contact sound during operation and prevents entry of fine chips and wear powders of metal into the cable or the like protection and guide device.

MEANS FOR SOLVING THE PROBLEMS

The invention solves the above-mentioned problems by providing a closed type cable or the like protection and guide device. The cable or the like resides in the flexible support and is protected and guided from a fixed end side mounting member toward a movable end side mounting member. The entire outer surface of the flexible support except for an inlet and an outlet of said cable or the like is covered with a heat resistant tubular cloth cover.

It is noted that although the material of the flexible support used in the present invention is a cloth. Alternatively, even a steel sheet support or a plastic support may be used. A steel sheet support is preferably used from when heat resistance, endurance, fire resistance, and strength are important factors. Further, as a structure, the above-mentioned conventional cable or the like protection and guide device can be used as it is. However, if a cable or the like can be reliably protected and guided any shape of the protective structure may be used.

Further, the invention solves the above-mentioned problems by providing a heat resistant tubular cloth cover made of aramid fiber.

Here, an aramid fiber used in the present invention means an aromatic polyamide fiber, and it is roughly divided into two kinds: para series in which benzene nuclei become a skeletal structure are linearly lined up; and, meta series in which benzene nuclei become a skeletal structure are arranged in a zigzag fashion. The aramid fiber used in the present invention includes para series aromatic polyamide fibers which exhibit excellent properties such as high strength, high elasticity, low expansion and contraction, and the like. When aramid fiber is used in connection with a machine tool or the like, since the fine chips or wear powders of metal to be discharged can reach considerable high temperature, meta series aromatic polyamide fibers which exhibit excellent properties such as heat resistance and fire resistance are preferably used.

Further, the invention provides that end portions of said heat resistant tubular cloth cover are fastened to the fixed end side mounting member and the movable end side mounting member by hose bands. The tubular cloth cover is linearly secured with Magic Tape(Trade Mark)(Trade Mark).

Here, as the hose band used in the present invention is a hose band commercially available as an article by the name of Hose Band. However, the use of a hose band composed of stainless steel excellent in corrosion resistance is particularly preferable.

Although the Magic Tape(Trade Mark) used in the present invention means a face fastener produced and marketed by Crarey Co., Ltd. of Japan under this Trade Mark, a face fastener of another company having the same function may be adopted.

Figure 5:
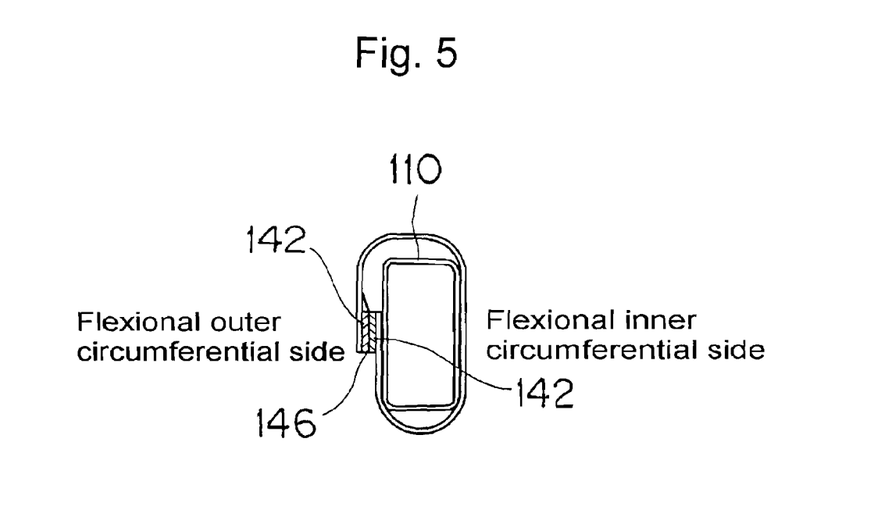
FIG. 5 is a cross-sectional view of the closed type cable or the like protection and guide device shown in FIG. 4 when taken along the line V-V.

The heat resistant tubular cloth cover made of aramid fiber of the present invention is heat resistant to 400° C. and the Magic Tape(Trade Mark) is heat resistant to 200° C. The heat resistant temperature of an aramid fiber cloth is considerably different from the heat resistant temperature of the Magic Tape. However, as shown in FIG. 5, the Magic Tape(Trade Mark) is used in such a form that it is sandwiched by aramid fiber cloths. For example, since the Magic Tape is not directly brought into contact with chips or the like heated at high temperature by friction heat, so the tubular cloth cover can be used to a heat resistant temperature of an aramid fiber cloth of 400° C. without problems.

EFFECTS OF THE INVENTION

A closed type cable or the like protection and guide device is provided in which a cable or the like is included in a flexible support to be protected and guided from a fixed end side mounting member toward a movable end side mounting member. The entire outer surface of the flexible support except for an inlet and an outlet of the cable or the like is covered with a heat resistant tubular cloth cover. The present invention has an effect that grating noise generated when a flexible support is flexed is shut out by the heat resistant tubular cloth cover.

Further, in the related art, fine chips or wear powders of metal are generated from a machine tool enter the inside of a cable or the like protection and guide device from a slight gap unavoidably formed in a flexible support may damage a cable or the like. Also, in the related art, fine chips or wear powders enter the gap so that smooth flexional operation is hindered.

The present invention prevents scattering of contact wear powder generated by friction between cables or the like included in a flexible support or sliding contact between components of the flexible support or the like into an operational space.

Further, since the heat resistant tubular cloth cover is obtained by sewing or weaving a cloth of aramid fiber, the tubular cloth cover exhibits excellent properties in heat resistance and fire resistance so that the entry of fine chips or wear powder of metal heated at high temperature by friction and the like into the flexible support is reliably blocked.

Further, since the end portions of the heat resistant tubular cloth cover are fastened to the fixed end side mounting member and the movable end side mounting member by hose bands and the tubular cloth cover is linearly secured with Magic Tape(Trade Mark), even if the closed type cable or the like protection and guide device is repeatedly flexed, the tubular cloth cover does not come off the support and the occurrence of a gap is prevented. Thus reliability is enhanced and at the same time the attachment operation of the tubular cloth cover can be easily performed and maintenance is reduced.

DESCRIPTION OF THE INVENTION

A closed type cable or the like protection and guide device is provided which includes a flexible support. The flexible support protects and guides it from a fixed end side mounting member toward a movable end side mounting member. The invention reduces the generation of noise due to sliding contact noise in an operating environment. The invention prevents the entry of fine chips and wear powders of metal into the inside of a cable or the like protection and guide device. The scattering of contact wear powders, generated by sliding contact between components of the cable or the like protection and guide device into an operation space can be prevented by covering the entire outer surface of the flexible support except for an inlet and an outlet for the cable. The heat resistant tubular cloth cover can assume different shapes as described above depending on the shape of the underlying structure.

Figure 1:
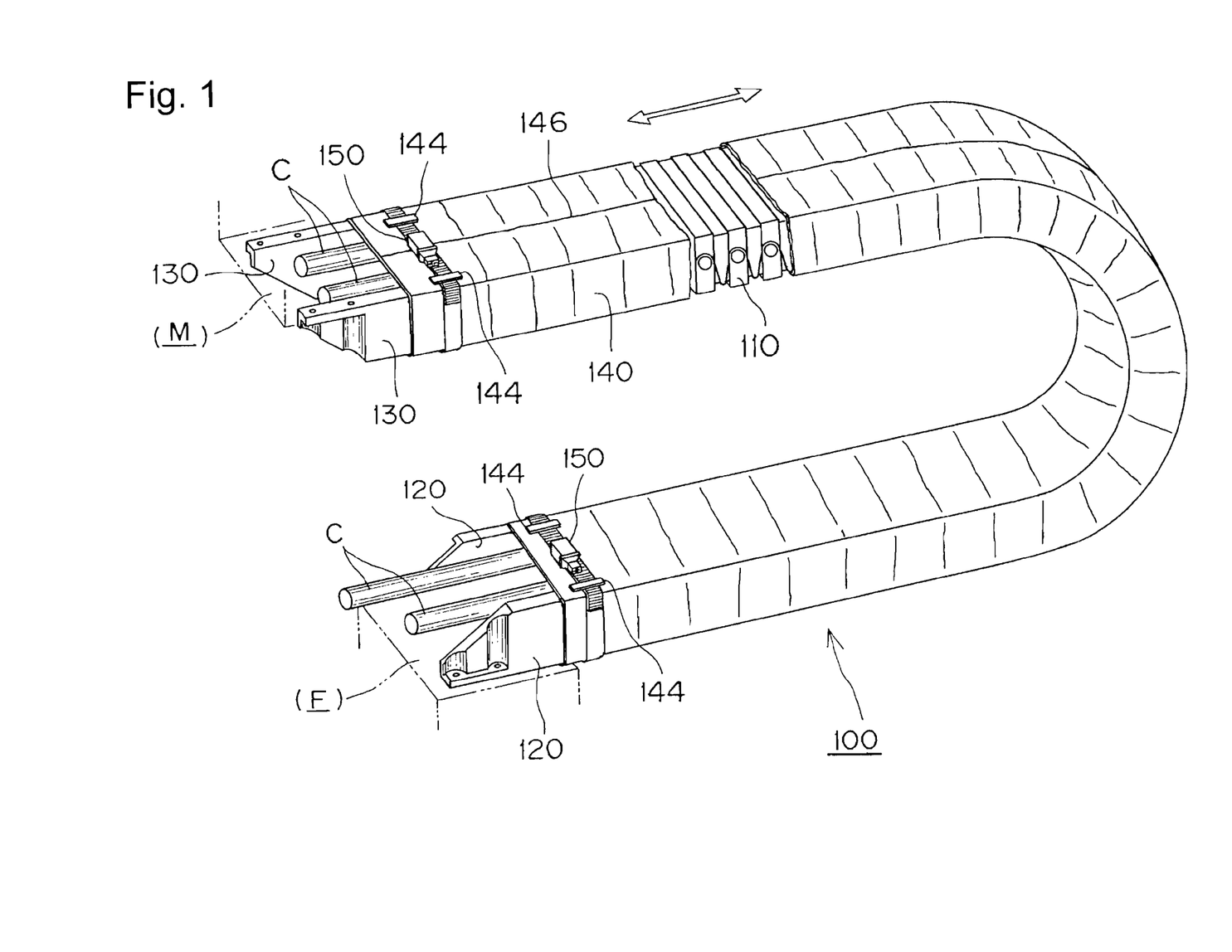
FIG. 1 is a perspective view showing the whole of a closed type cable or the like protection and guide device, which is an example of the present invention.
Figure 2:
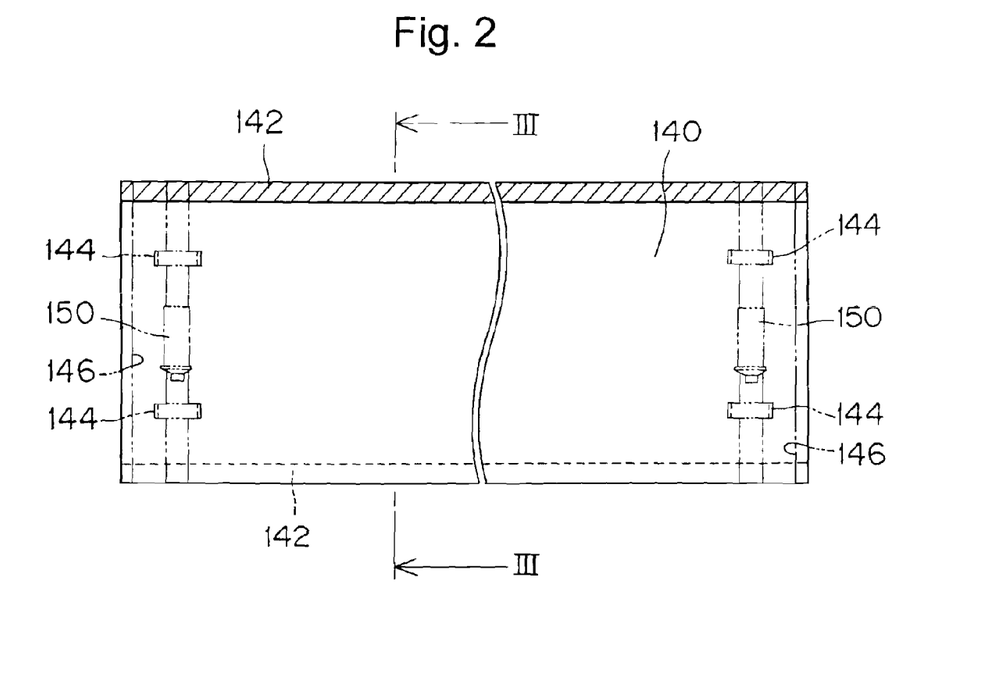
FIG. 2 is a plan view of a tubular cloth cover of the closed type cable or the like protection and guide device showing in FIG. 1.
Figure 3:
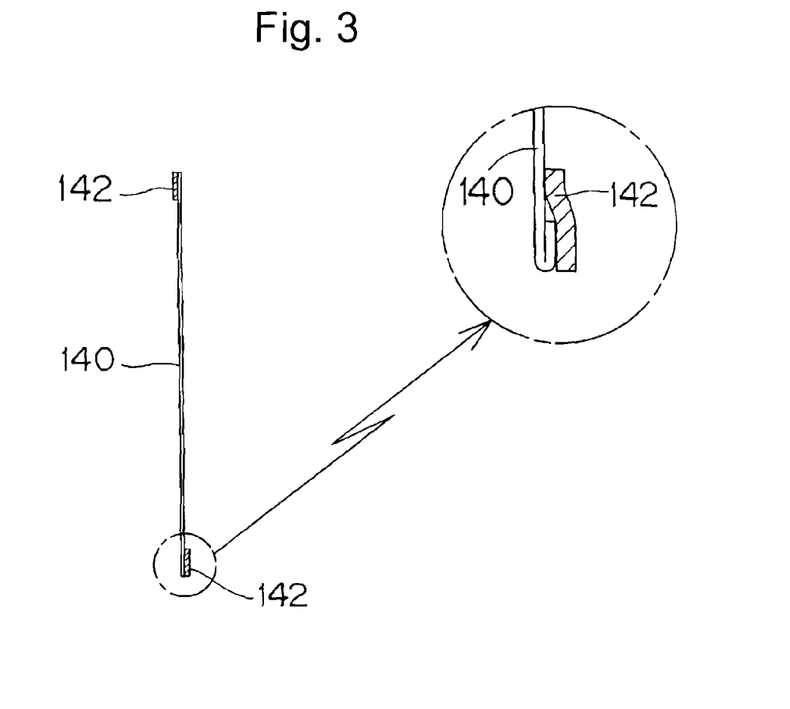
FIG. 3 is a cross-sectional view of the tubular cloth cover shown in FIG. 2 when taken along the line III-III.
Figure 4:
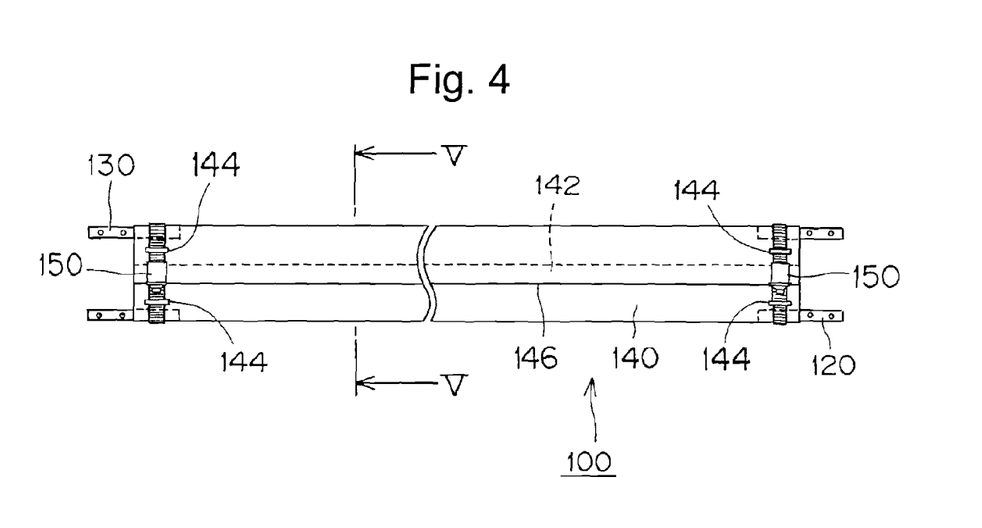
FIG. 4 is a top view in a use form of the tubular cloth cover shown in FIG. 2.
Figure 6:
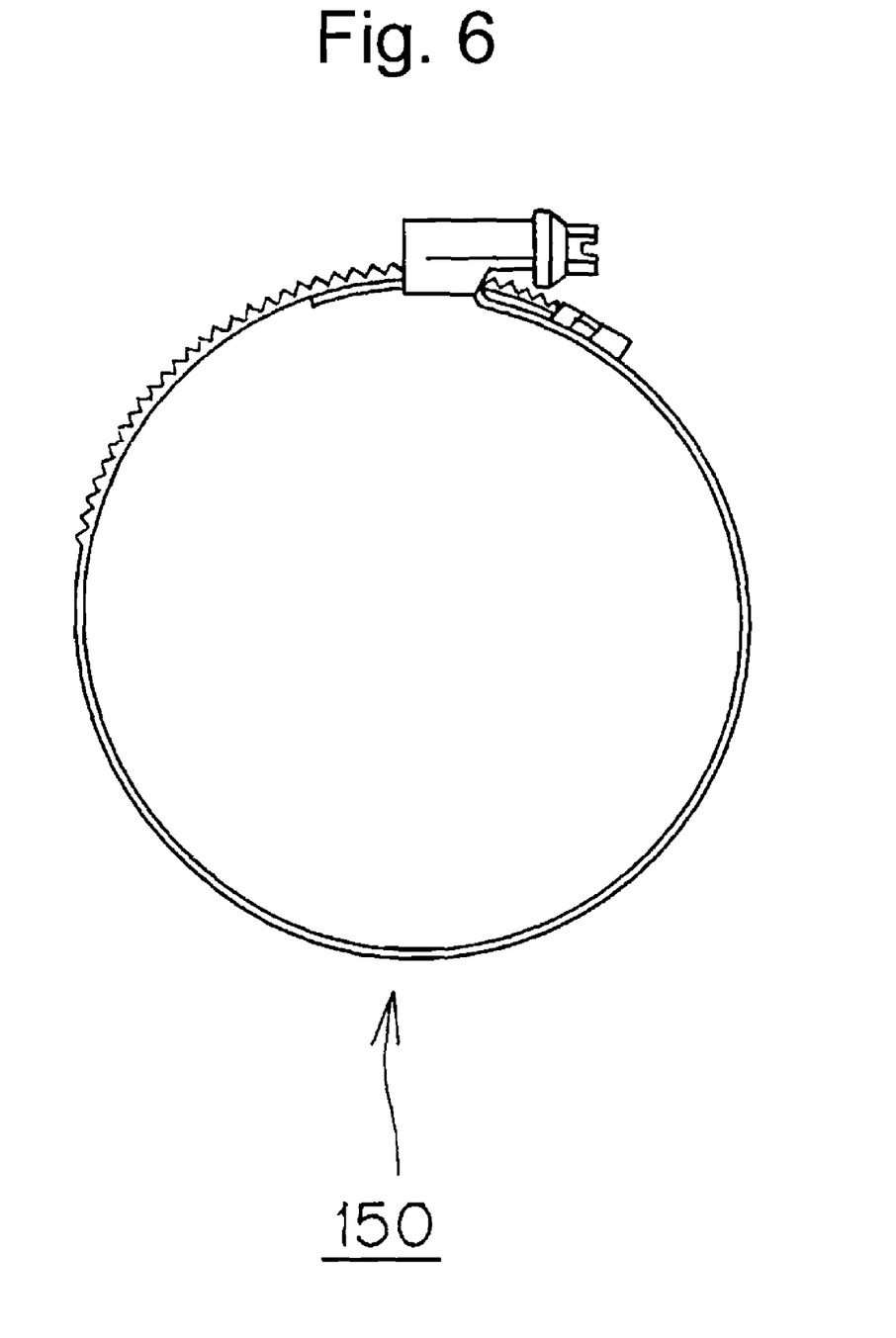
FIG. 6 is a plan view of a hose band of the closed type cable or the like protection and guide device shown in FIG. 1.

An example of a preferred closed type cable or the like protection and guide device of the present invention will be described with reference to FIGS. 1 to 6. It is noted that FIG. 1 is an entire view showing use of a closed type cable or the like protection and guide device 100, which is an example of the present invention. FIG. 2 is a plan view of a heat resistant tubular cloth cover 140, which is a member of the closed type cable or the like protection and guide device 100 shown in FIG. 1. FIG. 3 is a cross-sectional view of the tubular cloth cover 140 shown in FIG. 2 taken along the line III-III. FIG. 4 is a top view in a use form of the heat resistant tubular cloth cover 140 shown in FIG. 2. FIG. 5 is a cross-sectional view of the closed type cable or the like protection and guide device 100 shown in FIG. 4 taken along the line V-V. FIG. 6 is a plan view of a hose band 150, which is a member of the closed type cable or the like protection and guide device 100 shown in FIG. 1.

The closed type cable or the like protection and guide device 100 of the present invention includes a cable (cables) or the like C in a flexible support 110 and protects and guides the cables from a fixed section F of a machine tool or the like toward a movable section M. Further, the closed type cable or the like protection and guide device 100 of the present invention covers an entire outer surface of a flexible support 110 except for an inlet and an outlet of the cable (cables) or the like C, that is, a fixed end side mounting member 120 and a movable end side mounting member 130. The movable end side mounting member 130 is adhered to a movable section M in a machine tool which make operations such as cutting and polishing while moving. The fixed end side mounting member 120 is adhered to a fixed section on which a control device and an operating terminal resides which controls movement of the movable section M.

The heat resistant tubular cloth cover 140 uses cloth composed of an aramid fiber having excellent heat and fire resistance. This tubular cloth cover 140 is sewn so as to be longer in length by a few percent (%) than the entire length of the flexible support 110 and longer in width than an outer circumferential length of a vertical cross-section of the flexible support 110 by the width of the Magic Tape(Trade Mark) 142+α. As described above, the heat resistant tubular cloth cover 140 is adapted to be able to smoothly follow the flexional extension operation of the flexible support 110 by providing the dimensions of the cloth with a slight margin. Further, as shown in FIG. 3, to prevent both right and left end portions of the tubular cloth cover 140 in a longitudinal direction from fraying, an end of the cloth is subjected to folding half the width of the Magic Tape(Trade Mark) and stitching and Magic Tape is adhered to the stitched portion of the cloth so as to cover it. Further, as shown in FIG. 2, front and rear end portions of the tubular cloth cover 140 in a longitudinal direction are also subjected to stitching 146. Since the thickness of the cloth doubles, the stitching prevents the tubular cloth cover 140 from coming out of a hose band 150.

Further, in the vicinity of both end portions of the tubular cloth cover 140 hose band stoppers 144 are sewn so that the cloth does not come out of the hose band 150 or the position of the hose band 150 does not shifted. Such a hose band 150 shown in FIG. 6 is inserted into hose band stopper 144 and tubular cloth cover 140 is fastened to a fixed end side mounting member 120 and a movable end side mounting section 130.

The tubular cloth cover 140 is wrapped over the flexible support 110 in a longitudinal direction thereof so that it surrounds the flexible support 110 as shown in FIGS. 4 and 5. Since the tubular cloth cover is wrapped over the flexible support 110 so that a connected portion 146 of the tubular cloth cover 140 is positioned on a flexional outer circumferential side of the flexible support 110, when an appropriate tensile load is applied to the connected portion 146 and Magic Tapes(Trade Mark) 142 closely adhere to each other and it is difficult for the tubular cloth cover 140 to come out of the hose band 150. When the tubular cloth cover 140 wraps over the flexible support 110 so that the connected portion 146 is positioned on a flexional outer circumferential side of the flexible support 110, the outer appearance of the cable or the like protection and guide device is attractive and neat.

Further, since the connected portions 146 are fastened to each other by a Magic Tape(Trade Mark) the end portions of the tubular cloth cover 140 are closely adhered to each other whereby the entry of a foreign material is prevented. Further, since the Magic Tape 142 is not exposed outside as shown in FIG. 5, it does not catch or snag an external structure.

Further, when this cable or the like protection and guide device is used in a large machine tool, an outer surface of the tubular cloth cover 141 is subjected to coloring of yellow and black for example so that the existence of a cable or the like protection and guide device is recognized by an operator which effectively promotes caution.

INDUSTRIAL APPLICABILITY

According to the present invention, since the entire outer surface of a flexible support except for an inlet and an outlet for a cable (cables) or the like is covered with a heat resistant tubular cloth cover, the entry of fine chips and the like of metal from the outside to the inside of the flexible support can be prevented. A cable or the like is safely protected in its use and noise or scattering of wear powders from the inside of the flexible support to the outside are prevented and the like. Thus the use of the cable or the like protection and guide device of the present invention is suitable for use in clean environment and its industrial applicability is very high.

DESCRIPTION OF REFERENCE NUMERALS

100 . . . Closed type cable or the like protection and guide device
110 . . . Flexible support
120 . . . Fixed end side mounting member
130 . . . Movable end side mounting member
140 . . . tubular cloth cover
142 . . . Magic Tape(Trade Mark)
144 . . . Hose band stopper
146 . . . Connected portion
150 . . . Hose band
500 . . . Closed type cable or the like protection and guide device
510 . . . Inner frame
511 . . . Inner frame
511a . . . Cable or the like holding space
511b . . . Connected portion (having a connected convex portion)
511c . . . Connected portion (having a hole portion)
511d . . . Upper opening end surface
511e . . . Lower opening end surface
511f . . . Connected convex portion
511g . . . Connected hole portion
512 . . . Opening/closing lid body
520 . . . Outer frame
521 . . . Upper side outer frame
522 . . . Lower side outer frame
C . . . Cable or the like
F . . . Fixed section
M . . . Movable section
S . . . Connecting space

The invention claimed is:

1. A closed type cable protection and guide device, comprising:
 a cable;
 a flexible support;

said flexible support includes a fixed end side mounting member and a movable end side mounting member which moves with respect to said fixed end side mounting member articulating and bending said flexible support;

said flexible support forms a flexional circumferential bend having a flexional inner circumferential side during bending and said flexible support forms a flexional circumferential bend having a flexional outer circumferential side during bending;

said flexible support includes an outer surface, and, said outer surface includes a shape;

said cable resides substantially within said flexible support, said flexible support protects and guides said cable from said fixed end side mounting member to said movable end side mounting member;

a flexible heat resistant cloth cover completely surrounding and covering said outer surface of said flexible support from said fixed end side mounting member of said flexible support to said movable end side mounting member of said flexible support; and, said flexible heat resistant cloth cover approximates said outer shape of said flexible support.

2. A closed type cable protection and guide device according to claim 1, wherein said heat resistant cloth cover is made of aramid fiber.

3. A closed type cable protection and guide device according to claim 1, wherein:

said flexible heat resistant cloth includes first and second end portions;

a first hose band and a second hose band;

said first hose band fastens and secures said first end portion of said flexible heat resistant cloth cover to said fixed end side mounting member;

said second hose band fastens and secures said second end portion of said heat resistant cylindrical cloth cover to said movable end side mounting member;

a first adhesive face fastener and a second adhesive face fastener;

said flexible heat resistant cloth cover includes first and second edge portions extending from said fixed end side mounting member of said flexible support to said movable end side mounting member of said flexible support;

said flexible heat resistant cloth cover includes an inner side and an outer side;

said first edge portion of said flexible heat resistant cloth cover includes an inner side and an outer side;

said second edge portion of said flexible heat resistant cloth cover includes an inner side and an outer side;

said first adhesive face fastener affixed to said outer side of said first edge portion of said flexible heat resistant cloth cover;

said second adhesive face fastener affixed to said inner side of said second edge portion of said flexible heat resistant cloth cover;

said first adhesive face fastener affixed to said outer side of said first edge portion of said flexible heat resistant cloth cover and said second adhesive face fastener affixed to said inner side of said second edge portion of said flexible heat resistant cloth cover are affixed to each other from said fixed end side mounting member of said flexible support to said movable end side mounting member of said flexible support; and, said flexible heat resistant cloth cover completely sealing said flexible support preventing the intrusion of dirt into said flexible support and minimizing noise during operation of said device.

4. A closed type cable protection and guide device according to claim 1, wherein:

said flexible heat resistant cloth includes first and second end portions;

a first hose band and a second hose band;

said first hose band fastens and secures said first end portion of said flexible heat resistant cloth cover to said fixed end side mounting member;

said second hose band fastens and secures said second end portion of said heat resistant cylindrical cloth cover to said movable end side mounting member;

a first adhesive face fastener and a second adhesive face fastener;

said flexible heat resistant cloth cover includes first and second edge portions extending from said fixed end side mounting member of said flexible support to said movable end side mounting member of said flexible support;

said flexible heat resistant cloth cover includes an inner side and an outer side;

said first edge portion of said flexible heat resistant cloth cover includes an inner side and an outer side;

said second edge portion of said flexible heat resistant cloth cover includes an inner side and an outer side;

said outer side of said first edge portion is folded upon itself and stitched and said first adhesive face fastener is affixed to said folded and stitched outer side of said first edge portion of said flexible heat resistant cloth cover;

said inner side of said first edge portion is folded upon itself and stitched and said second adhesive face fastener is affixed to said folded and stitched inner side of said second edge portion of said flexible heat resistant cloth cover;

said first adhesive face fastener affixed to said folded and stitched outer side of said first edge portion of said flexible heat resistant cloth cover and said second adhesive face fastener affixed to said folded and stitched inner side of said second edge portion of said flexible heat resistant cloth cover are affixed to each other from said fixed end side mounting member of said flexible support to said movable end side mounting member of said flexible support; and, said flexible heat resistant cloth cover completely sealing said flexible support preventing the intrusion of dirt into said flexible support and minimizing noise during operation of said device.

* * * * *